United States Patent
Landberg (10) Patent No.: US 10,473,215 B2
(45) Date of Patent: Nov. 12, 2019

(54) FLUID ACTUATOR ARRANGEMENT

(71) Applicant: SAAB AB, Linköping (SE)

(72) Inventor: Magnus Landberg, Linköping (SE)

(73) Assignee: SAAB AB, Linköping (SE)

( * ) Notice: Subject to any disclaimer, the term of this patent is extended or adjusted under 35 U.S.C. 154(b) by 22 days.

(21) Appl. No.: 15/567,925

(22) PCT Filed: Apr. 21, 2015

(86) PCT No.: PCT/SE2015/050453
§ 371 (c)(1),
(2) Date: Oct. 19, 2017

(87) PCT Pub. No.: WO2016/171594
PCT Pub. Date: Oct. 27, 2016

(65) Prior Publication Data
US 2018/0119817 A1 May 3, 2018

(51) Int. Cl.
*F15B 15/14* (2006.01)
*F16J 3/04* (2006.01)
*F15B 11/18* (2006.01)

(52) U.S. Cl.
CPC .......... *F16J 3/046* (2013.01); *F15B 11/183* (2013.01); *F15B 15/149* (2013.01); *F15B 15/1423* (2013.01); *F15B 15/148* (2013.01)

(58) Field of Classification Search
CPC ....... F16J 3/046; F15B 11/183; F15B 15/149; F15B 15/1423
See application file for complete search history.

(56) References Cited

U.S. PATENT DOCUMENTS

| 4,463,663 | A | 8/1984 | Hanson, Jr. et al. | |
| 4,526,086 | A * | 7/1985 | Holton | F15B 11/18 91/176 |
| 6,216,831 | B1 | 4/2001 | Taylor | |
| 2001/0045703 | A1 * | 11/2001 | Scarlett | F16J 9/16 277/459 |

FOREIGN PATENT DOCUMENTS

| DE | 2649958 A1 | 5/1978 |
| DE | 3642695 A1 | 6/1988 |
| DE | 10344574 A1 | 4/2005 |
| SU | 993677 A1 | 12/1983 |

OTHER PUBLICATIONS

International Search Report of PCT/SE2015/050453, dated Jan. 25, 2016.
Written Opinion of PCT/SE2015/050453, dated Jan. 25, 2016.
Extended European Search Report in corresponding European Application No. 15890047.2 dated Dec. 4, 2018 (8 pages).

* cited by examiner

Primary Examiner — Abiy Teka
(74) Attorney, Agent, or Firm — Venable LLP; Jeffri A. Kaminski

(57) ABSTRACT

An elongated fluid actuator arrangement includes a cylinder body comprising a first and second end portion. A piston body comprising a piston force area forming portion and a sleeve portion, which extends through said first and second end portions and exposes first and second outer section outside the cylinder body. A piston rod extends coaxially through said sleeve portion. The arrangement comprises a first and second extendable and contractible cover member each joined to the cylinder body and to the respective sleeve portion outer section.

11 Claims, 4 Drawing Sheets

FLUID ACTUATOR ARRANGEMENT

CROSS-REFERENCES TO RELATED APPLICATIONS

This application is a U.S. National Stage application of PCT/SE2015/050453, filed 21 Apr. 2015 and published on 27 Oct. 2016 as WO 2016/171594 which is hereby incorporated by reference in its entirety.

TECHNICAL FIELD

The present invention relates to an elongated fluid actuator arrangement according to the preamble of claim 1.

The present invention concerns the industry using hydraulic and/or pneumatic actuators for different types of applications and also concerns the manufacture industry producing such arrangements. The present invention also concerns the manufacture industry producing cover solutions for such elongated fluid actuator arrangements.

The invention is not limited thereto, but can also be used for replacing electrical actuator arrangements and can be adapted for application of a wide range of different types industries.

The present invention may also relate to fluid actuator arrangements using more than two cooperating actuators coupled to a common piston rod. By controlling the pressurizing of a body cylinder chamber of a first actuator for propelling the piston body of the actuator and in this connection pressurizing a piston rod engagement and disengagement means (such as a membrane) of said piston body, there will be a motion of the common piston rod together with the piston body in one stroke. The motion of the piston rod is maintained by controlling the other actuator in a similar way at the same time as the first actuator not being pressurized for disengagement of the piston rod.

BACKGROUND ART

Current cylinders are provided with wall entrance seal units. However, for achieving satisfactory seal, the friction force between the seal and the piston rod envelope surface will be high.

This type of seal units, such as piston rod seals of a cylinder body have been known for a long time. There is at least needed a thin film of clean lubricant fluid between the seal and the piston rod envelope surface. Without such film, the seal will undergo premature wear and consequently unwanted leakage. Thicker lubricant fluid films would cause leakage caused by overflowing fluid lubricant.

Hydraulic equipment in general, and hydraulic cylinders especially, thus leaks hydraulic fluid (e.g. oil) when they are pressurized and actuated.

Many users of actuators choose to use electric or pneumatic actuators for avoiding this problem. They want to avoid having to deal with oil-soaked equipment of both health and environmental reasons.

The applicant of this application has also described different embodiments of an elongated fluid actuator arrangement in the international patent applications PCT/SE2014/050753 and PCT/SE2014/051377, but which is not yet published. The arrangement disclosed in PCT/SE2014/051377 works well, but is subjected to development.

Rubber bellows or boots are installed on devices with ranges of motion to provide protection from dust and particles. Rubber boots reduce the frequency of maintenance and increase the life by protecting the equipment from contamination. Rubber boots per se have been known for a long time. One type of such rubber boot is disclosed in U.S. Pat. No. 4,154,434.

There is an object to provide an elongated fluid actuator arrangement of the type defined in the introduction which is environmental friendly and provides clean working environment.

There is also an object to provide a high actuator speed with low friction and high efficiency of such elongated fluid actuator arrangement. There is an energy aspect associated with overcoming the friction when actuation is wanted. The piston force diminished by friction, when using hydraulic actuators, could be up to 30%. Minimizing this loss is essentially the motivation for many industries dealing with research in friction.

An object of the present invention is to develop an energy saving elongated fluid actuator arrangement providing reliable functionality and/or providing actuator arrangements that can be applied to long distance and extended piston rod members. These are preferably put into use in e.g. lifts and high bay storage arrangements having such extended and relatively long piston rods.

A yet further object is to provide an elongated fluid actuator arrangement that is easy to serve and that involves cost-effective maintenance in service.

An object of the present invention is to develop an energy saving elongated fluid actuator arrangement providing reliable functionality and/or providing actuator arrangements that can be applied to long distance and extended piston rod members. These are preferably put into use in e.g. lifts and high bay storage arrangements having extended and relatively long piston rods.

An object is to improve current fluid actuator arrangements in mobile and industrial applications.

An object is to provide elongated fluid actuator arrangements to accomplish work with only minor amount of input force.

The present invention provides an elongated fluid actuator arrangement that can be used in material handling equipment, agricultural equipment, vehicles, excavators, wellhead and jacking systems, construction equipment, hydraulic presses and others. One aspect is to adapt the arrangement to 3D-printing in plastic, composite and/or metal applications for aircraft or automotive industry. A yet further aspect is to provide an arrangement that can be used in automated storage and retrieval systems for car parking and rough-terrain robots, so called legged robot systems. There is also an object to provide an elongated fluid actuator arrangement that can be used in military equipment utilizing hydraulic and/or pneumatic mechanisms. This includes armoured personnel carriers, aircraft material handlers, cranes and loaders, hook lifts, track adjusters and truck-mounted bridge layers etc.

SUMMARY OF THE INVENTION

This has been achieved by the elongated fluid actuator arrangement defined in the introduction and being characterized by the features of the characterizing part of claim 1.

Preferably, the extendable and contractible cover member comprises a cover boot or bellow.

There is thus provided a seal that prevents external leakage and at the same time permits lower friction in work when the sleeve portion of the piston body moves relative to the cylinder body.

Thereby, the escaped hydraulic oil is returned to the reservoir and can be reused instead of contaminating the environment.

Consequently, this means that the piston rod can be kept clean and that it does not require a wiper or similar means. That is, no contaminations would enter into the cylinder body via the seal between said cylinder body and the sleeve portion (or between the through hole wall of the cylinder body and the envelope surface of the sleeve portion of the piston body).

Thus, the piston rod can be kept clean but also the oil in the cylinder chambers.

Thus, this opens up for use of the elongated fluid actuator arrangement in harsher environments.

In such way is achieved that the interior of the cylinder body is free from contaminations.

Thereby is provided that fluid eventually leaking from the cylinder body will not reach the piston rod.

Suitable, a seal unit is arranged in a through hole wall entrance of the cylinder body end portion permitting a certain hydraulic fluid leakage between the cylinder body and the sleeve portion.

Preferably, the seal unit comprises a wiper seal, a rod seal, a wear seal or combinations thereof.

In such way is achieved that the actuator force otherwise diminished by friction can be increased by minimizing the friction loss by permitting a certain leakage of hydraulic oil between the cylinder body and the sleeve portion (i.e. between the respective through hole wall and envelope surface of the sleeve portion and/or between said envelope surface and a seal unit arranged there between).

Suitably, the seal unit comprises a plain bearing.

Alternatively, the plain bearing comprises bronze alloys and/or tinbronze and/or leadfree bronze and/or copper and/or aluminium-bronze and/or carbon graphite.

By this way is achieved that high actuator speed and efficiency is made possible by said minimizing of the friction by permitting a certain oil leakage between the cylinder body and the sleeve portion (i.e. between the seal unit mounted in the through hole end wall of the cylinder and the envelope surface of the sleeve portion.

Consequently, the extendable and contractible cover member permits a predetermined or "high" leak through the seal between the cylinder body and the piston sleeve of the piston body. This reduces friction and energy losses, which otherwise in prior art can be as large as between 10%-30%. The efficiency is thus increased.

Suitably, by firmly mounting the extendable and contractible cover member to the cylinder body end and to the sleeve portion outer end in a sealed manner, the piston rod will be free from hydraulic fluid which counteracts accumulation of dirt on the piston rod, which dirt otherwise would cause wear on the piston rod and sleeve portion inner running surface and engagement means.

In such way the actuator can be used for many different applications, as in fast moving elevators in multi-storey buildings.

Furthermore, such high rod speed permitted where the friction is reduced, may be possible to even further applications, for example for automated storage and retrieval systems for car parking etc.

In such way is an arrangement achieved that is environmental friendly and which promotes for a clean working environment.

Preferably, the first and second elongated extendable and contractible cover member each forms a hermetically sealed interior between the cylinder body and the respective outer section and each interior encompassing the exposed first and second outer section of the sleeve portion outside the cylinder body.

Suitably, the elongated extendable and contractible cover member comprises a hydraulic fluid drain means arranged for collecting overflow hydraulic fluid.

For example, the relatively large external hydraulic fluid leakage that occurs over the seals (which leakage constitutes the lion's share of the actuator hydraulic fluid leakage) thus being collected in the boot or bellow and further removed from the boot or bellow through a connecting hose back to reservoir.

In such way is achieved that hydraulic oil (or other fluid) leakage can be collected from the interior of the elongated extendable and contractible boot and directly returned to the fluid supply device for re-use.

Preferably, the hydraulic fluid drain means comprises a ring-shaped collecting member forming an open section facing the sleeve portion envelope surface.

Thereby is provided a well-defined collector for collecting the fluid flowing from the seal between the sleeve portion and the cylinder body through hole and eventual seal there between.

Suitably, the ring-shaped collecting member also serves as a fastening element comprising a first flange releasingly attached to the cylinder end wall and a second flange attached to the elongated extendable and contractible cover member.

Preferably, the arrangement is used for hydraulic application and the hydraulic pressure used is between 100 to 300 bar, preferably 200 to 250 bar depending on application.

Suitably, a shuttle valve is arranged in said first piston device and is adapted for direct fluid communication with said first cavity and said first and second cylinder chamber of the first cylinder. The basic structure of a shuttle valve is like a cavity having e.g. three openings, one on each end and one in the middle. A ball or other blocking valve element moves freely within the cavity. When pressure of the fluid is exerted through one end opening it pushes the ball towards the opposite end. This prevents the fluid from traveling through that opposite end opening, but allows it to flow through the middle opening. In this way two different sources can provide fluid pressure to a common membrane member without any back flow from cylinder chamber to the other.

In such way is achieved that the cylinder chamber having the highest pressure (and thereby propelling the piston body) will provide the membrane member cavity with the same pressure as in the pressurized cylinder chamber. The membrane member will thus be pressurized (expanding the inner surface of the piston body) and provides engagement of the piston body to the piston rod, wherein the piston body manage propel the piston rod.

Preferably, the hydraulic fluid drain means forms a gap between the hydraulic fluid drain means and the sleeve portion envelope surface.

The gap is suitably determined with a measure that provides that no contact occurs between the hydraulic fluid drain means (e.g. a collector ring with flanges projecting inwardly towards the envelope surface of the sleeve portion) and the piston rod at the same time as the gap permits a certain air flow to/from the interior of the extendable and contractible cover member from/to a pressure balancing means of the hydraulic fluid drain means.

In such way there is no contact with the piston rod otherwise causing friction and energy losses. Thereby it is possible to arrange the cup shaped collector means with its side wall ends adjacent the piston rod surface envelope and at the same time use the side walls of the cup shaped collector for creating a well-defined space for collecting the hydraulic fluid.

Suitably, the hydraulic fluid drain means is positioned adjacent the cylinder body end and comprises a drainage opening.

There is thus provided that the fluid leaking from (either unwanted leakage or desired fluid flow passing the seal unit, e.g. a bronze bearing, between the cylinder body and the sleeve portion) the cylinder body directly can be collected in a direct manner and thus prevented from reaching the inner wall of the extendable and contractible cover member.

Preferably, the cover member comprises a pressure balancing means.

In such way is achieved that the air pressure difference otherwise occurring between the respective interior of the first and second extendable and contractible cover member will be equalized during work.

Suitably, the pressure balancing means comprises a compensating balance line arranged between the first and second extendable and contractible cover member.

Thus, there has been provided a simple and cost-effective means for equalizing the interior air pressure between the extendable and contractible cover members and also easy maintenance operation.

Preferably, the extendable and contractible cover member comprises rubber material.

Suitably, the extendable and contractible cover member comprises plastic and/or metal and/or rubber with high plastic elongation characteristics.

Alternatively, the extendable and contractible cover member comprises stainless steel and/or titanium and/or Inconel and/or composite and/or nickel and/or copper or other high-strength, corrosion-resistant materials.

Preferably the extendable and contractible cover member is barrel-shaped, conical shaped, truncated conical shaped, cylinder shaped, hemi-spherical, spherical, or is of other suitable shape.

In such way is achieved that there is no need to use additional stroke length for picking up the contracted boot or bellow material. The arrangement can thus be made less bulky.

Suitably, the extendable and contractible cover member is a single or multi-plied cover member.

Preferably, the extendable and contractible cover member may comprise a coating of copper or other suitable protection of the surface.

Suitably, the cover member is removable.

Preferably, the rubber or metallic (metal bellow) boots over the outer piston rods.

Alternatively, the fluid actuator arrangement is provided for hydraulic fluid application.

Preferably, a first and second cylinder chamber of the cylinder body being separated by said piston body.

Alternatively, the first and second cylinder chamber being provided for connection to a valve member means of a fluid supply device.

Suitably, the sleeve portion of the piston body comprises a piston rod engagement and disengagement means provided to be operated by said fluid supply device.

Preferably, the piston rod engagement and disengagement means is arranged to engage or disengage the piston body to/from the piston rod.

Suitably, the piston rod engagement and disengagement means comprises a cavity means forming a flexible piston inner wall portion of the sleeve portion adapted for releasable engagement with the piston rod arrangement.

Preferably, the piston body comprises the piston force area forming portion protruding in a direction radially outwardly from the sleeve portion. The piston force area forming portion defines opposite cross-sectional piston areas. The piston body defining this piston force area forming portion exhibits a first diameter measure. The outer surface of the piston force area forming portion exhibits, seen in the longitudinal direction, a first length which is in contact with the cylinder inner surface. The piston body further comprises the sleeve portion having a second diameter measure that is smaller than said first diameter measure of the piston force area forming portion. The piston body comprises the sleeve portion further having a second length seen in the longitudinal direction that is longer than the first length.

Preferably, an engagement area, defined by an engagement zone between the piston body and the piston rod, is larger than the cross-sectional piston force area of the piston force area forming portion of the piston body.

Suitably, the elongated fluid actuator arrangement further comprises a second cylinder body comprising a first and second end portion, a second piston body comprising a second piston force area forming portion and a second sleeve portion, which extends through said first and second end portions of the second cylinder body and exposes first and second outer section outside the cylinder body.

Preferably, the piston rod extending coaxially through the first piston body also extends coaxially through the second piston body. A third and fourth elongated extendable and contractible cover member each being joined to the second cylinder body and to the second sleeve portion outer sections.

Suitably, the respective first and second piston body divides respective a first and second cylinder body into a first and second cylinder chamber each provided for connection to a valve member means of a fluid supply device.

Preferably, a first piston rod engagement and disengagement means of the first piston body cooperates with a second piston rod engagement and disengagement means of the second piston body by means of controlling said valve member means via a control unit. The first and second piston rod engagement and disengagement means each is provided for engagement and disengagement of the respective piston body to/from the common piston rod.

The sleeve portion can be called "block portion", "engaging portion", "extended clamping portion" of the piston body, or other suitable term. The piston force area forming portion and the sleeve portion integrally form the piston body. The sleeve portion may comprise one or more than two sleeve parts which are rigidly coupled to the piston force area forming portion or to each other.

BRIEF DESCRIPTION OF THE DRAWINGS

The present invention will now be described by way of examples with references to the accompanying schematic drawings, of which.

DETAILED DESCRIPTION

Hereinafter, embodiments of the present invention will be described in detail with reference to the accompanying drawings, wherein for the sake of clarity and understanding of the invention some details of no importance may be deleted from the drawings. The elongated fluid actuator arrangement 2 herein is also called arrangement.

Figure 1:
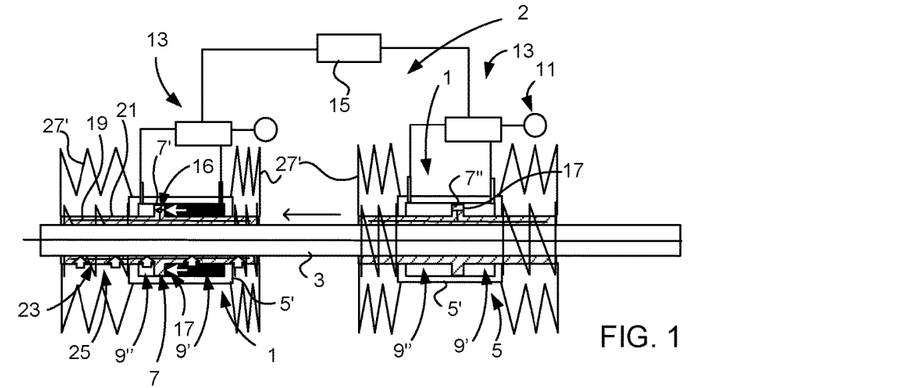
FIG. 1 illustrates one aspect of the invention.

FIG. 1 illustrates one aspect of the invention. There is shown two cooperating actuators 1 of an elongated fluid actuator arrangement 2 which propels a common piston rod 3. Each actuator 1 comprises a cylinder 5, a piston 7, a first and second chamber 9', 9". A fluid supply 11 is coupled to a set of control valves 13. The controlling of the control valves 13 is made by a CPU 15. By pressurizing the first chamber 9' of the first cylinder 5', the pressurized fluid will entry a fluid port 16 of a pressure area forming portion 17 of the piston 7, facing the first chamber 9'. Thereby is also pressurized a cavity 19 of a sleeve portion 21 of the piston 7. The cavity 19 is part of a rod engagement and disengagement means (membrane member 23). The pressurizing of the membrane member 23 will provide an expansion of an inner surface of the sleeve portion in a direction radially inwardly. The piston 7 will thereby be clamped to the piston rod 3 by the engagement of the inner surface to the piston rod 3. By alternate controlling the pressurizing (and thus engagement/disengagement) of the respective first 7' and second piston 7", the common piston rod 3 can be propelled a considerable distance (extremely long stroke performance) and alternatively with different forces by controlling the control valves 13. By using a relatively large engagement and disengagement means (membrane member 23) area in relation to the piston pressure area forming portion 17, the engagement of the piston 7 to the piston rod 3 is rigid. For achieving such engagement, the piston 7 is formed with an integral sleeve 21 portion having its both ends (outer sleeve portions 25) outside the cylinder 5. The engaging force thus provides sufficient friction fixing the actuated piston 7 in position to the piston rod 3, wherein the engagement force prevails over the performed axial force. The respective actuator 1 is provided with a metal bellow 27' at the respective end for collecting hydraulic fluid.

Figure 2A:
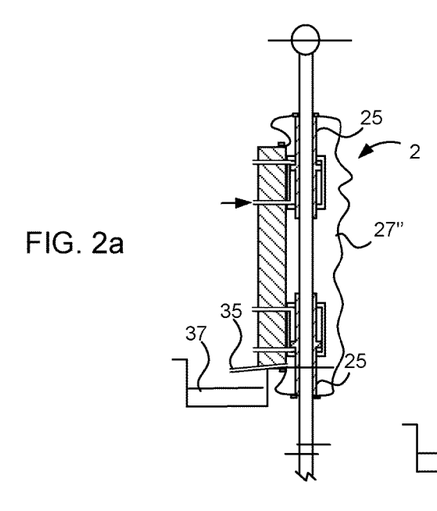
FIGS. 2a to 2b illustrate a yet further aspect of the invention.
Figure 2B:
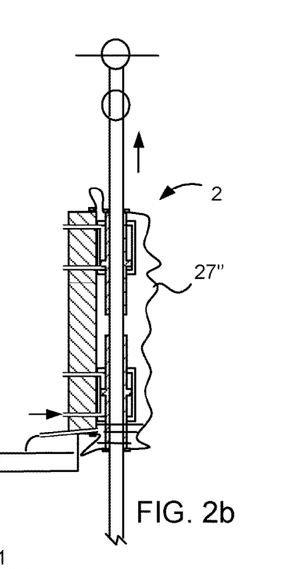

FIGS. 2a to 2b illustrate a further aspect of the invention. There is shown a vertical arrangement 2. The ends of the arrangement 2 and outer sleeve portions 25 are covered by a common plastic bag 27" for protecting outer environment from oil leakage. A collecting hose 35 is connected to the common plastic bag 27" for collecting overflow hydraulic oil 37.

Figure 3:
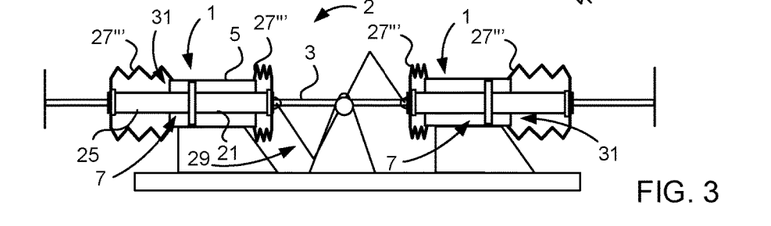
FIG. 3 illustrates a yet further aspect of the invention.

FIG. 3 illustrates two actuators 1 of an elongated fluid actuator arrangement 2 arranged for propelling a common piston rod 3. A linkage arrangement 29 is provided to the respective piston 7. The actuation of one piston 7 will return the other piston to a starting point for engagement by means of the linkage arrangement 29. Exposed portions of the outer end wall surfaces 31 of the cylinder 5 and outer sleeve portions 25 of the piston sleeve 21 of the piston 7 outside the cylinder 5 are covered by means of rubber boots 27'''.

Figure 4:
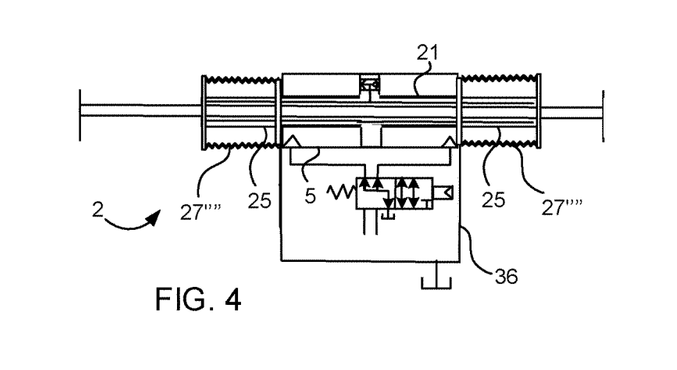
FIG. 4 illustrates an actuator according to one aspect.

FIG. 4 illustrates an arrangement 2 according to one aspect. Projecting sleeve portions 25 outside the cylinder 5, i.e. the exterior portions of the piston sleeve 21 are sealingly covered by boots 27''''. A collecting hose 36 is connected to the boots 27'''' for collecting overflow hydraulic oil from the boots 27''''.

Figure 5:
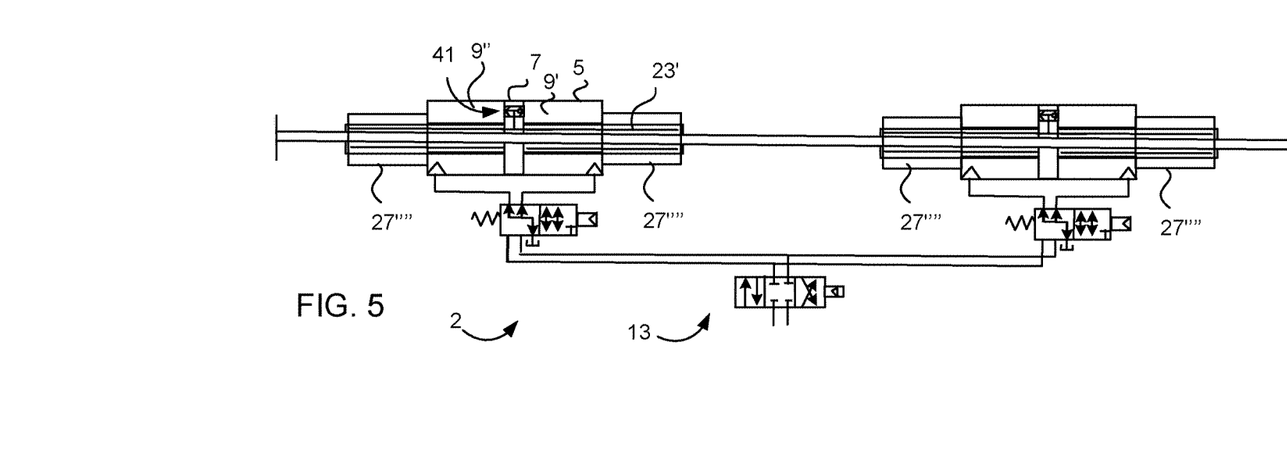
FIG. 5 illustrates a control valve means of a further arrangement according to one aspect.

FIG. 5 illustrates a control valve means 13 of a further arrangement 2 according to one aspect. A shuttle valve 41 is arranged in a piston 7 of the arrangement 2 dividing each cylinder 5 into a first and second cylinder chamber 9', 9" and is adapted to direct fluid to an engagement membrane 23' of the piston 7. The basic structure of a shuttle valve consists of a cavity having three openings, one on each end and one in the middle. A ball moves freely within the cavity. When fluid pressure is exerted through one end opening it pushes the ball towards the opposite end. This prevents the fluid from traveling through that opposite end opening, but allows it to flow through the middle opening. In this way the first 9' and second 9" cylinder chamber can provide a fluid pressure to the common engagement membrane 23' without any back flow from one cylinder chamber to the other.

Figure 6:
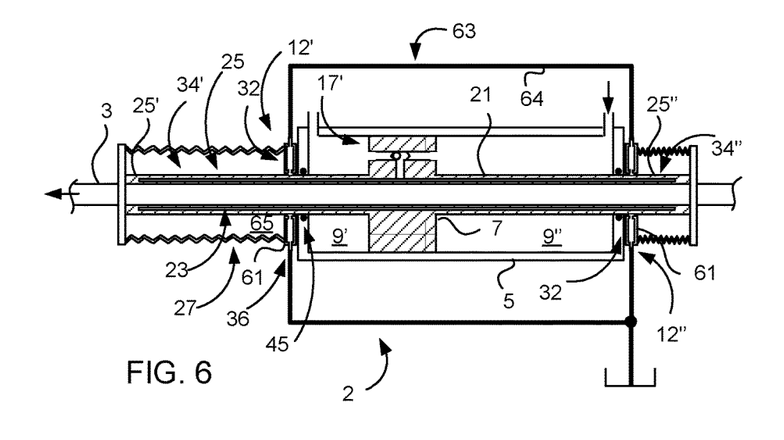
FIG. 6 illustrates one aspect of the present invention.

FIG. 6 illustrates an arrangement 2 horizontally oriented for producing horizontal stroke movement according to one aspect. There is shown a cylinder 5 having a piston 7 dividing the interior of the cylinder 5 into a first 9' and second 9" cylinder chamber. The cylinder 5 further comprises a sleeve 21 which is made as an integral part of the piston 7. The respective end portion 25', 25" of the sleeve 21 protrudes from a first and second end wall entrance 32 (of each end portion 12', 12" of the cylinder 5). A respective first and second seal 45 is mounted between the surface envelope of the sleeve 21 and the corresponding wall entrance 32. The piston 7 thus comprises a piston force area forming portion 17' and also sleeve portions 25, which sleeve portions 25 extend through the respective wall entrance 32 and which expose first 34' and second 34" outer section outside the cylinder 5.The seals 45 are adapted to permit a predetermined leakage for achieving an optimal low friction between the seals 45 and the surface envelope of the sleeve 21 during work. The piston 7 further comprises an engagement and disengagement means (e.g. membrane 23) arranged within the sleeve 21 and provided for making engagement and disengagement between the piston 7 and a piston rod 3. A cavity of the membrane 23 is pressurized via the present pressurized cylinder chamber (here 9"), wherein the inner surface of the sleeve 21 expands and provides engagement of the piston 7 to the piston rod 3. The cavity is coaxially arranged in the sleeve and extends in longitudinal direction parallel with the piston rod 3. The piston rod 3 thus extends coaxially through the respective sleeve portion 25. The arrangement 2 further comprises a first and second extendable and contractible cover member (e.g. a metal bellow) 27, each joined to the respective cylinder 5 end and to the respective end portion 25' of the sleeve 21 outer section. The extendable and contractible cover member 27 comprises a hydraulic fluid drain means 36 arranged for collecting overflow hydraulic fluid passing through the respective seal 45. The hydraulic fluid drain means 36 comprises a ring-shaped collecting member 61 forming a cup-like open section facing the piston rod 3. Each extendable and contractible cover member 27 also comprises a pressure balancing means 63 in the form of a hose 64 having its ends connected to the interior 65 of the respective extendable and contractible cover member 27 for free air communication between the interiors 65 of the respective member 27. In such way is achieved that the air pressure difference, that otherwise would occur between the respective interior 65 of the first and second extendable and contractible cover member 27, will be equalized during work.

Figure 7:
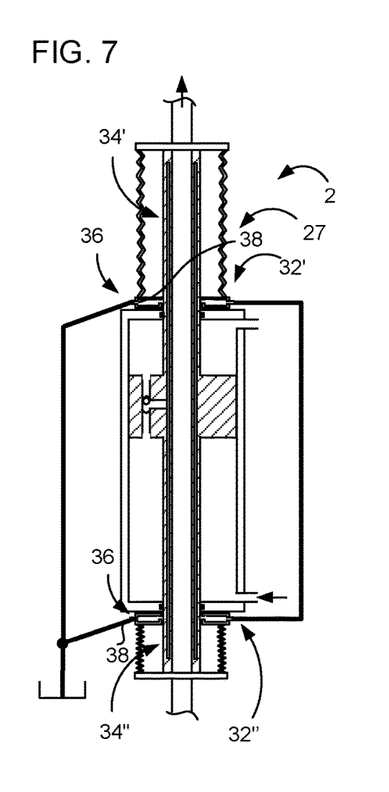
FIG. 7 illustrates one aspect of the present invention.

FIG. 7 schematically illustrates an arrangement 2 vertically oriented for producing vertical stroke movement according to one aspect. The arrangement 2 comprises a first and second hydraulic fluid drain means 36 each positioned adjacent the respective cylinder 5 body end portions 12. A drainage opening 38 is provided in respective hydraulic fluid drain means 36 of respective extendable and contractible cover member 27 for collecting overflow hydraulic oil. Each extendable and contractible cover member 27 covers the first 34' and second 34" outer section of the piston 7.

Figure 8A:
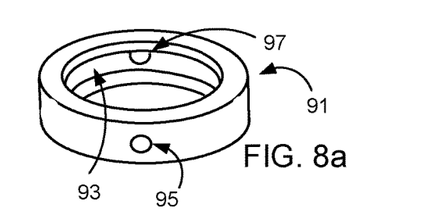
FIG. 8a to 8d illustrate examples of different designs of hydraulic fluid drain means.
Figure 8B:
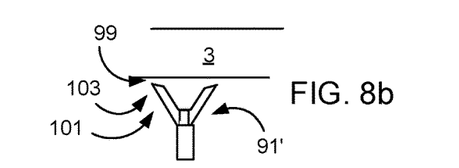
Figure 8C:
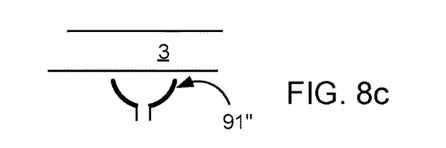
Figure 8D:
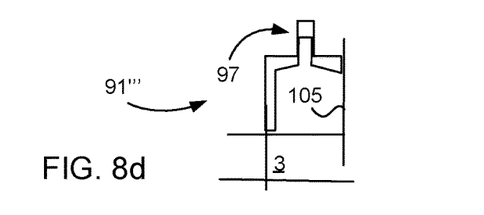

FIGS. 8a to 8d schematically illustrate different shapes of hydraulic fluid drain means. FIG. 8a shows a ring-shaped hydraulic oil collecting ring 91, adapted for a horizontally oriented arrangement, comprising an outer ring wall and side walls. The respective side wall is formed with a flange and an open slot 93 there between extending in circumferential direction. A fluid drain aperture 95 is provided in the outer ring wall. A pressure balancing hose connecting aperture 97 is provided in the outer ring wall opposite the fluid drain aperture 95. FIG. 8b shows a cross-section of a cup-like hydraulic fluid drain collector 91'. The cross-section is Y-formed and its upper flanges extend towards the piston rod 3. The hydraulic fluid drain means is arranged to said arrangement in such way that the means forms a gap 99 between outer ends 103 of collecting flanges 101 of the collector 91' and the piston rod 3 envelope surface. FIG. 8c shows a collector 91" with a cross-section that is cup-shaped. Furthermore, FIG. 8d shows a cross-section of the hydraulic fluid drain circumferential ring means 91'" that is L-shaped. A pressure balancing hose connecting port 97 is provided to an outer collecting wall. A fluid drain aperture (not shown) is provided opposite the port 97. The hydraulic fluid drain circumferential ring means 91'" is mounted in abutment with an inner wall 105 of the extendable and contractible cover member forming a sealed joint.

Figure 9:
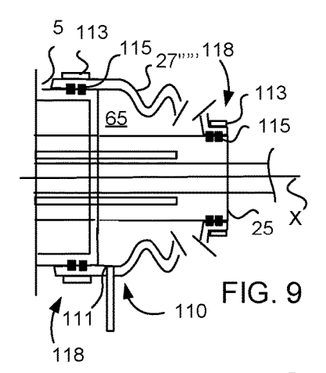
FIG. 9 illustrates an end section of an arrangement according to one aspect.

FIG. 9 shows an embodiment of the invention wherein the hydraulic fluid drain means 110 is positioned adjacent the cylinder body 5 wall end and comprises a drainage opening 111 positioned at lowest point of the extendable and contractible cover member. The extendable and contractible cover member, in this embodiment a protective rubber boot 27'''', is removable by releasing support spring rings 113. The protective rubber boot 27'''' exhibits a prolongation along a longitudinal extension axis X. The protective rubber boot 27'''' additionally comprises seals 115 for achieving a sealed interior 65 of the protective rubber boot 27''''. First and second end section 117, 118 of the protective rubber boot 27'''' is secured at least indirectly to respectively the cylinder body 5 and the outer sleeve portion 25 by means of said support spring rings 113 arranged in circumferential direction. The protective rubber boot 27'''' is also axially supported by the seals 115. Circumferential grooves are provided at respective envelope surface of the cylinder body 5 and the outer sleeve portion 25 into which grooves the seals 115 are mounted. The seals 115 and the support spring rings 113 prevent the protective rubber boot 27'''' from slipping down.

Figure 10:
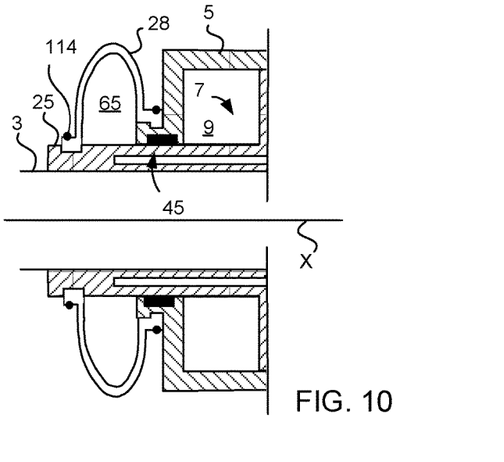
FIG. 10 illustrates a yet further aspect of the invention.

FIG. 10 illustrates a further embodiment of the invention. A bellow 28 is sealingly arranged to the outer sleeve portion 25 of the piston 7 and the cylinder 5 respectively. Clamping rings 114 hold the bellow 28 in place. A wall entrance seal 45 (bronze bearing) is arranged between a through bore entrance wall of the cylinder and an outer envelope surface of the sleeve portion of the piston. The wall entrance seal 45 is adapted to permit a certain overflow passage for hydraulic fluid from the cylinder chamber 9 to the interior 65 of the bellow 28. This overflow volume of the hydraulic fluid passing through the wall entrance seal 45 is nearly accurate pre-determined for optimally achieving that the friction force between the wall entrance seal and the sleeve portion envelope surface will be as low as possible, but still at the same time the entrance seal 45 being designed so that the cylinder chamber 9 can be pressurized optimally for effective piston stroke and effective engagement of the piston 7 to the piston rod 3.

Figure 11A:
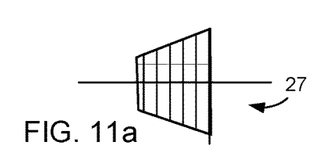
FIGS. 11a to 11b illustrate examples of different designs of extendable and contractible cover member.
Figure 11B:
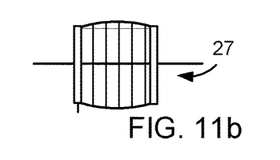

FIGS. 11a to 11b illustrate different shapes of extendable and contractible cover members 27 according to further aspects. FIG. 11a illustrates an extendable and contractible cover member having a conical shape and FIG. 11b illustrates an extendable and contractible cover member having a barrel-shaped form.

Figure 12:
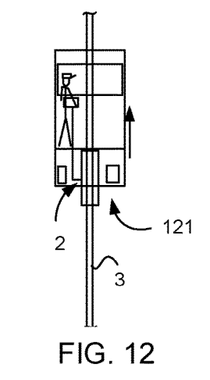
FIG. 12 illustrates an application taking advantage of the present invention.

FIG. 12 illustrates a lift cage 121 and a piston rod 3 for use of an arrangement according to a further aspect of the invention. A further parallel elongated guiding arrangement (not shown) is also adapted to the lift cage 121 for guiding the latter. An elongated fluid actuator arrangement 2 comprises three hydraulic actuators (See FIG. 13) cooperating with each other for moving the lift cage along the piston rod 3. Respective cylinder is provided with a piston comprising a piston rod engagement and disengagement member adapted for alternating releasable engagement with the piston rod 3.

Figure 13:
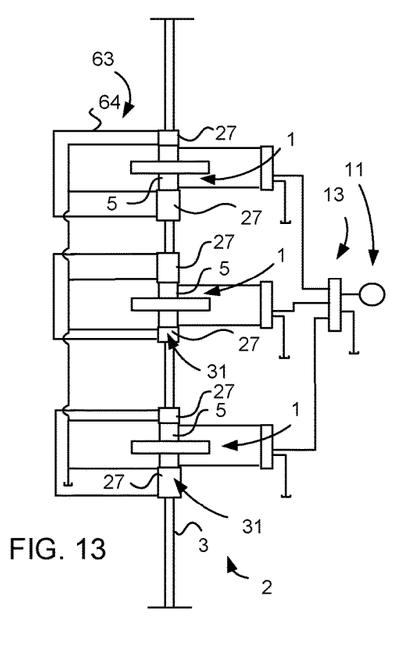
FIG. 13 illustrates three cooperating actuators according to one aspect.

In FIG. 13 is the arrangement 2 in FIG. 12 shown schematically. Each cylinder body 5 comprises at its outer end wall surfaces 31 an extendable and contractible cover member 27 for collecting hydraulic fluid (hydraulic oil) flowing through entrance seals (not shown) arranged between the cylinder body 5 and piston outer sleeve portion (not shown) and which hydraulic fluid can be re-used for actuating the actuators 1. Furthermore, each extendable and contractible cover member 27 comprises a pressure balancing means 63 including an open hose 64 coupled between the upper and lower extendable and contractible cover member 27 of respective actuator 1. Cylinder chambers (not shown) of respective actuator 1 are connected to control valves 13 of a fluid supply 11.

Figure 14:
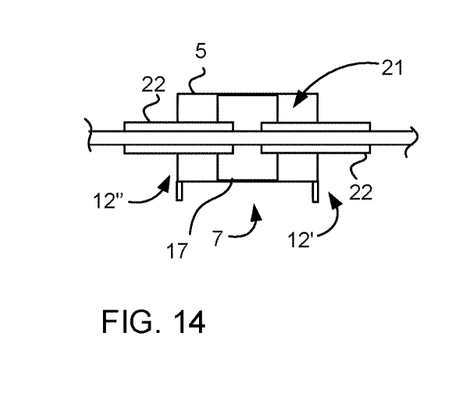
FIG. 14 illustrates a piston body comprising a piston force area forming portion and a sleeve portion.

FIG. 14 illustrates a piston body 7 comprising a piston force area forming portion 17 and a sleeve portion 21, which extends through first and second end portions 12', 12" of a cylinder 5. The piston force area forming portion 17 and the sleeve portion 21 integrally form the piston body. The sleeve portion 21 comprises at least two sleeve parts 22 which are rigidly coupled to the piston force area forming portion 17.

The present invention is of course not in any way restricted to the preferred embodiments described above, but many possibilities to modifications, or combinations of the described embodiments, thereof should be apparent to a person with ordinary skill in the art without departing from the basic idea of the invention as defined in the appended claims. One aspect involves that coupling of the extendable and contractible cover member to the cylinder body (preferably to the end of the cylinder body) and to the outer sleeve portion (preferably to the end of the sleeve portion) can be performed using a variety of methods. One such method is to use one or more O-rings, clamping rings, duplex clamping rings and/or combinations thereof, which encircle or otherwise are mounted to the end region of the extendable and contractible cover member in contact with the cylinder body and outer sleeve portion respectively so that the extendable and contractible cover member is sealed thereto. Alternatively, such coupling may be performed via inclusion of metal rings, plastic rings, or the like. The hydraulic fluid drain means may be designed with a cup-shaped form, as a through bore, trough-shaped or shaped in any suitable way for collecting hydraulic fluid entering the interior of the cover member and drain off to a hydraulic fluid collecting tank outside the cover member. The extendable and contractible cover member may be formed as a one-piece, undivided boot or bellow member or can comprise a plurality of section depending upon application. Any type of suitable accordion shaped boot can be installed to protect the piston rod and engagement means and prevent ingestion of contaminant across the piston rod seals. The extendable and contractible cover member may have an ovate shape, conical, dome-shaped, hemi-spherical, spherical or other shapes and may exhibit circular, oval, square or other suitable cross section.

The invention claimed is:

1. An elongated fluid actuator arrangement comprising:
a cylinder body comprising a first and second end portion;
a piston body comprising a piston force area forming portion and a sleeve portion, which extends through said first and second end portions and exposes first and second outer section outside the cylinder body;
a piston rod extending coaxially through said sleeve portion; and
the sleeve portion of the piston body comprises a piston rod engagement and disengagement means provided to be operated by a fluid supply device;
wherein
the arrangement comprises a first and second extendable and contractible cover member each joined to the cylinder body and to the respective sleeve portion outer section for providing a seal that prevents external leakage and at the same time permits lower friction in work when the sleeve portion of the piston body moves relative the cylinder body; and
the extendable and contractible cover member comprises a hydraulic fluid drain means arranged for collecting overflow hydraulic fluid, the overflow hydraulic fluid overflowing into the extendable and contractible cover member from the cylinder body.

2. The arrangement according to claim 1, wherein the hydraulic fluid drain means comprises a ring-shaped collecting member forming an open section facing the sleeve portion.

3. The arrangement according to claim 1, wherein the hydraulic fluid drain means forms a gap between the hydraulic fluid drain means and a sleeve portion envelope surface.

4. The arrangement according to claim 1, wherein the hydraulic fluid drain means is positioned adjacent the respective cylinder body end portion and comprises a drainage opening.

5. The arrangement according to claim 1, wherein the extendable and contractible cover member comprises a pressure balancing means.

6. The arrangement according to claim 5, wherein the pressure balancing means comprises a compensating balance line or hose arranged between the first and second extendable and contractible cover member.

7. The arrangement according to claim 1, wherein a seal unit is arranged in a through hole wall entrance of the cylinder body end portion permitting a certain hydraulic fluid leakage between the cylinder body and the sleeve portion.

8. The arrangement according to claim 7, wherein the seal unit comprises a plain bearing.

9. The arrangement according to claim 8, wherein the plain bearing comprises bronze alloy and/or tinbronze and/or leadfree bronze and/or copper and/or aluminium-bronze and/or carbon graphite.

10. The arrangement according to claim 1, wherein the extendable and contractible cover member comprises rubber and/or metal material.

11. The arrangement according to claim 1, wherein the extendable and contractible cover member is removable from the cylinder body and the respective sleeve portion outer section.

* * * * *